United States Patent
Yonekura

(10) Patent No.: US 11,593,020 B2
(45) Date of Patent: Feb. 28, 2023

(54) CONSISTENT ENTITY TAGS WITH MULTIPLE PROTOCOL DATA ACCESS

(71) Applicant: EMC IP Holding Company LLC, Hopkinton, MA (US)

(72) Inventor: Takafumi Yonekura, Bellevue, WA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 48 days.

(21) Appl. No.: 17/010,353

(22) Filed: Sep. 2, 2020

(65) Prior Publication Data
US 2022/0066682 A1 Mar. 3, 2022

(51) Int. Cl.
*G06F 3/06* (2006.01)
(52) U.S. Cl.
CPC .......... *G06F 3/0655* (2013.01); *G06F 3/0604* (2013.01); *G06F 3/0676* (2013.01)
(58) Field of Classification Search
CPC ..... G06F 3/0655; G06F 3/0604; G06F 3/0676
See application file for complete search history.

(56) References Cited

U.S. PATENT DOCUMENTS

| | | | |
|---|---|---|---|
| 7,228,299 B1 | 6/2007 | Harmer et al. | |
| 8,655,848 B1* | 2/2014 | Leverett | G06F 16/1844 707/660 |
| 2005/0033926 A1* | 2/2005 | Dumont | G06F 16/9574 711/138 |
| 2006/0059204 A1* | 3/2006 | Borthakur | G06F 16/951 |
| 2010/0299437 A1* | 11/2010 | Moore | H04L 67/1008 709/226 |
| 2012/0084270 A1* | 4/2012 | Jayaraman | G06F 3/0608 707/692 |
| 2013/0080403 A1* | 3/2013 | Yamakawa | G06F 3/0661 707/690 |
| 2014/0280487 A1* | 9/2014 | Seay | H04L 67/30 709/203 |
| 2016/0132536 A1 | 5/2016 | Lee | |
| 2017/0286707 A1* | 10/2017 | Eda | G06F 16/1827 |
| 2018/0181582 A1* | 6/2018 | Keymolen | H04L 67/32 |

FOREIGN PATENT DOCUMENTS

WO 2015140728 A1 9/2015

OTHER PUBLICATIONS

International Search Report and Written Opinion dated Aug. 9, 2021 for PCT Application Serial No. PCT/US2021/028997, 15 pages.

* cited by examiner

*Primary Examiner* — Mark A Giardino, Jr.
(74) *Attorney, Agent, or Firm* — Amin, Turocy & Watson, LLP

(57) ABSTRACT

Techniques are provided for consistent entity tags with multiple protocol data access. In an example, a file storage system is configured to process data according to file storage protocol(s) and object storage protocol(s). An object storage protocol can utilize entity tags that indicate whether an object (represented with a file in the file storage system) has changed. Where a file storage protocol is utilized to modify a file, an indication may be stored that indicates that the file lacks a valid entity tag. If an object storage operation is made to retrieve an object, and if the object corresponds to a valid entity tag, then that entity tag can be returned as part of the response. If the object does not correspond to a valid entity tag, then the file storage system can generate a new entity tag and return the newly generated entity tag as part of the response.

20 Claims, 12 Drawing Sheets

CONSISTENT ENTITY TAGS WITH MULTIPLE PROTOCOL DATA ACCESS

TECHNICAL FIELD

The present application relates generally to performing computer storage operations on a computer file system using multiple computer storage protocols.

BACKGROUND

A computer file system can perform operations on data that it stores, such as opening a new or existing file, writing data to an opened file, reading data from an opened file, and closing an opened file. In a file system, distinct pieces of data (as well as metadata about the data being stored) can be stored as files, and the files can be stored in a hierarchy of directories. Another type of computer storage system can be object storage.

In an object storage system, data can be stored as an object that can comprise the data being stored, metadata about the data being stored, and a unique identifier for the object relative to other objects in the object storage system. That is, a difference between a file system storage and an object system storage is that, with a file system storage data can be stored hierarchically, and with object system storage, data can be stored in a flat address space.

BRIEF DESCRIPTION OF THE DRAWINGS

Numerous aspects, embodiments, objects, and advantages of the present embodiments will be apparent upon consideration of the following detailed description, taken in conjunction with the accompanying drawings, in which like reference characters refer to like parts throughout, and in which.

DETAILED DESCRIPTION

Overview

Figure 1:
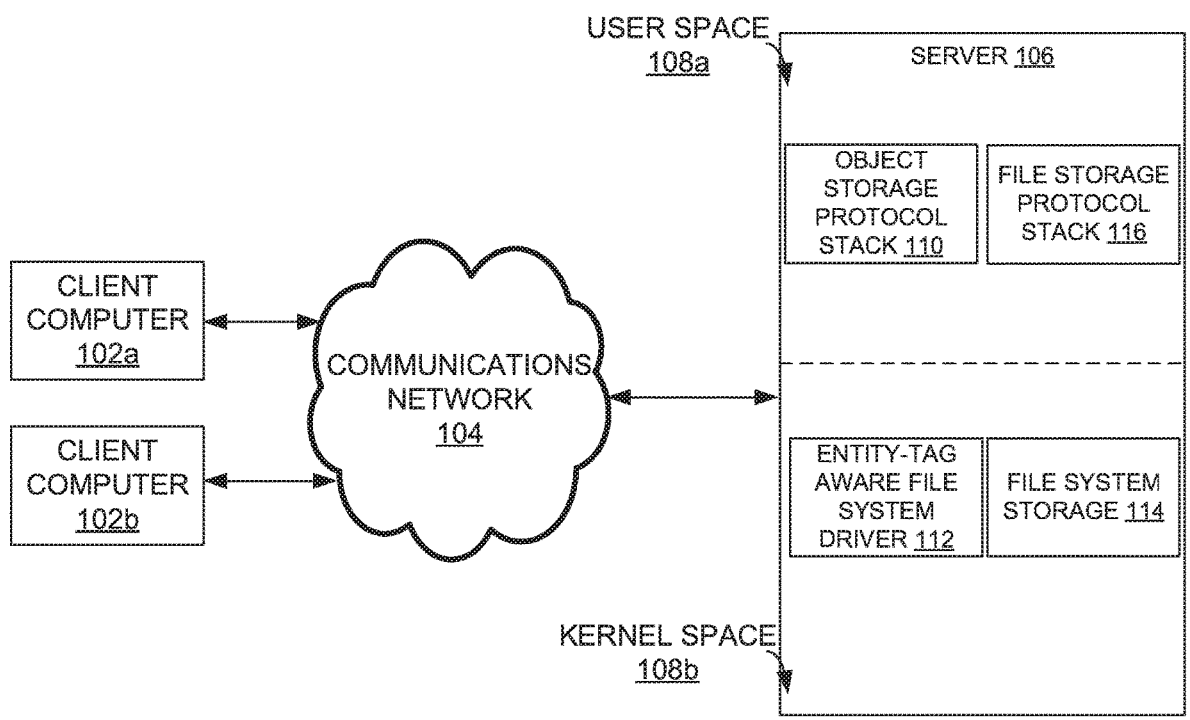
FIG. 1 illustrates an example system architecture that can facilitate maintaining consistent entity tags with multiple protocol data access, in accordance with certain embodiments of this disclosure.

A computer system can implement an object storage protocol stack on top of a file system storage (such as an ISILON ONEFS file system storage). In such an example, a client computer can send data operations to the computer system that specify object storage operations such as a GET object operation (to retrieve object contents and metadata), a PUT object operation (to create or replace an object), a COPY object operation (to copy an existing object to another object), and DELETE object operation (to delete an existing object).

The protocol stack can receive these object storage operations, and convert each of them into one or more corresponding file system operations, such as an OPEN file operation (to create a new file or access an existing file), a READ file operation (to read the contents of a file), a WRITE file operation (to write to the contents of a file), a CLOSE file operation (to close an opened file handle for a file), and an UNLINK file operation (to delete a file). The protocol stack can then send these corresponding file system operations to a file system driver of the computer system, and the file system driver can implement these file system operations on a file system of the computer system.

In this manner, a client can specify object storage operations to a computer system that implements a file system, and these object storage operations can be effectuated on the file system.

An object storage protocol that works in conjunction with a file storage protocol can return a consistent entity tag (ETag) value for an object, while also maintaining an ability to detect a change made by another protocol (which could affect a corresponding object's ETag value). Where a client provides a value (such as a hash value, or a MD5 value) for an object on a PUT object operation, an example server that implements both an object storage protocol and a file system protocol in conjunction can store that value to a userspace extended attribute of its file system (along with storing data of the object as a file), and can set a flag that indicates that the object has a valid value that can be used as an ETag value (this flag can be a md5_valid bit).

Where the file that corresponds to the object is modified by a file system operation, the flag can be cleared (such as by setting it equal to zero) to indicate that the object lacks a valid value that can be used as an ETag value.

In an example where a client does not provide a value for an object on a PUT object operation, the corresponding flag can be set (or allowed to remain) at False, or zero. Where the flag that corresponds to an object is set at False, such an example server can respond to a GET object operation with a server-generated value, such as a concatenation of a 64-bit logical Mode number (LIN) that corresponds to an Mode of the object, and a 64-bit value that identifies a modification time of the file that corresponds to the object (such as a mtime value on some system architectures).

In another example, a client computing device uses a PUT object operation to store an object on a server. The client can provide a message digest (MD5) value for this object in a Content-MD5 filed in a hypertext transfer protocol (HTTP) header. Where a MD5 is provided for the object, that value can be stored by the server as a corresponding file system file's userspace extended attribute, and the file's internal md5_valid bit can be set to True. A md5_valid bit can be cleared on any data modification of a file. Where a MD5 value is not provided in a PUT object operation, or a md5_valid big is cleared in response to manipulating the file by another protocol (such as a network file system (NFS) protocol or a server message block (SMB) protocol), then in response to a client sending a GET object operation, the server can respond with a server-generated value as an ETag value in the response. In some examples, this server-generated value can be a combination of a 64-bit LIN value and a 64-bit mtime value.

Using these techniques, a client can be made aware via an ETag value whether an object has been changed by another PUT object operation, or by a file system operation. That is, consistent behavior in ETag values can be implemented when a file storage protocol modifies a file, because that file storage modification leads to the server returning a new ETag value in response to a GET object operation, which indicates that the object has been modified subsequent to when the prior ETag value was set. Put another way, the present techniques can be implemented to avoid returning a stale ETag value after a file modification, in part because a md5_value can be cleared by a file system layer in a file storage transaction.

Example Architectures

FIG. 1 illustrates an example system architecture 100 that can facilitate maintaining consistent entity tags with multiple protocol data access, in accordance with certain embodiments of this disclosure. As depicted, system architecture 100 comprises client computer 102a, client computer 102b, communications network 104, and server 106. In turn, server 106 can comprise user space 108a and kernel space 108b. Server 106 can also comprise object storage protocol stack 110 and file storage protocol stack 116, which operate in user space 108a. Server 106 can also comprise entity-tag aware file system driver 112 and file system storage 114 that operate in kernel space 108b.

Kernel space 108b can generally comprise a memory area of server 106 utilized by an operating system kernel and some device drivers of server 106, where these are effectuated with computer-readable instructions. Then, user space 108a can generally comprise a memory area of server 106 utilized by other components of server 106, where these other components are effectuated with computer-readable instructions.

Figure 12:
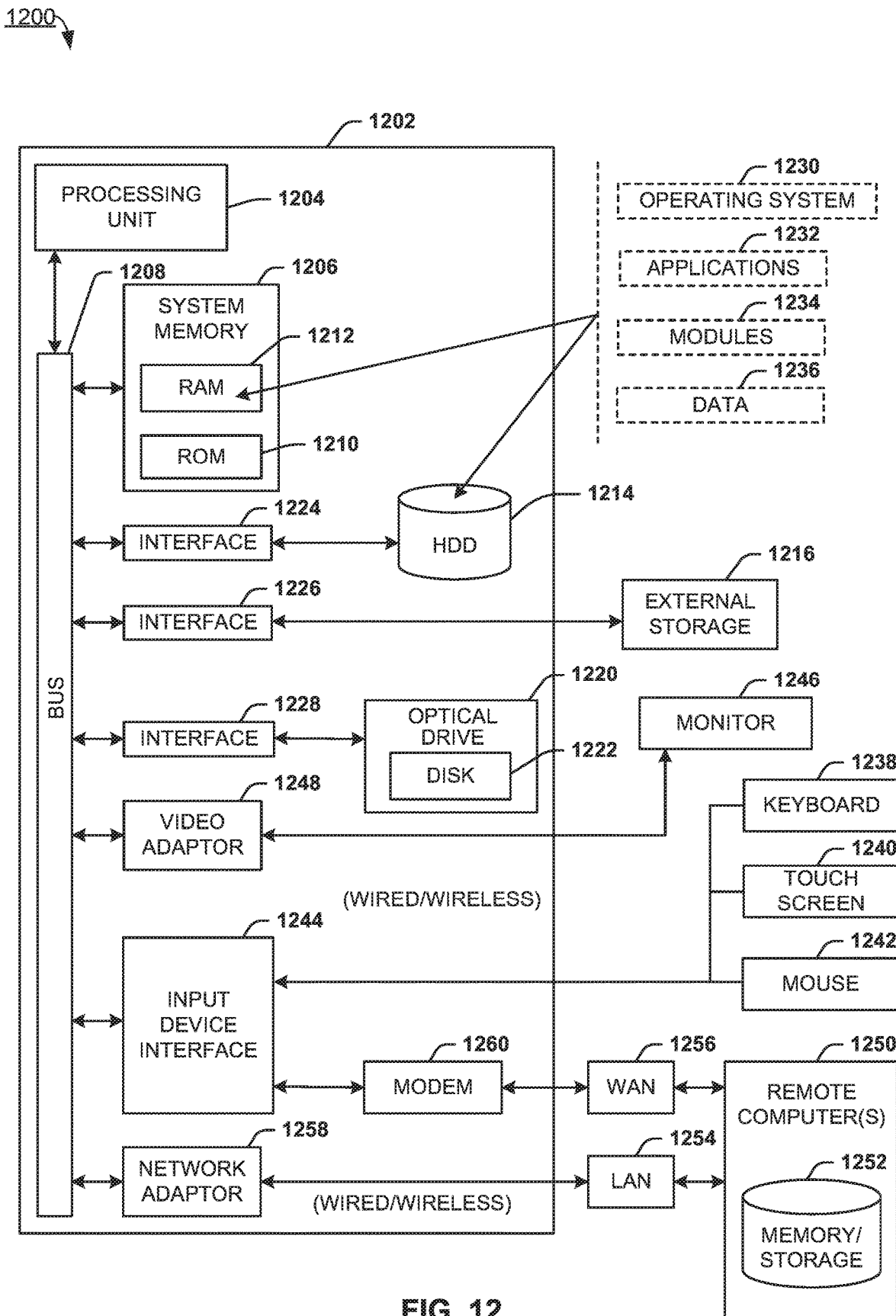
FIG. 12 illustrates an example block diagram of a computer operable to execute certain embodiments of this disclosure.

Each of client computer 102a, client computer 102b, and server 106 can be implemented with one or more instances of computer 1202 of FIG. 12. In some examples, server 106 comprises a distributed storage system that comprises multiple instances of computer 1202 of FIG. 12.

Communications network 104 can comprise a computer communications network, such as the INTERNET, or an isolated private computer communications network.

Each of client computer 102a and client computer 102b can send requests to server 106 to perform object storage operations on data (e.g., a GET object operation and/or a PUT object operation), as well as send requests to server 106 to perform file system operations on data (e.g., a READ file operation and/or a WRITE file operation). Client computer 102a and client computer 102b can send these requests to server 106 via communications network 104.

Server 106 can be configured to store and operate on data in a file system storage. So, where object storage operations are involved, server 106 can receive these object storage operations from client computer 102a and client computer 102b, and effectuate corresponding file system operations. Server 106 can receive these object storage operations from client computer 102a and client computer 102b at object storage protocol stack 110.

Object storage protocol stack 110 can receive an object storage operation and convert it into one or more file storage operations. Object storage protocol stack 110 can then send these file storage operations one at a time in an input/output (I/O) request packet (IRP) that is directed to entity-tag aware file system driver 112 (which can provide access to file system storage 114).

When entity-tag aware file system driver 112 processes a PUT object operation that includes an entity tag, entity-tag aware file system driver 112 can store the entity tag in an extended attribute of a file that corresponds to the object identified by the PUT operation. Furthermore, entity-tag aware file system driver 112 can set a md5_valid flag to True.

When entity-tag aware file system driver 112 processes a PUT object operation that does not include an entity tag, entity-tag aware file system driver 112 can set a corresponding md5_valid flag to False, or where the md5_valid flag exists and is set to False, leave it be.

When entity-tag aware file system driver 112 processes a file storage protocol operation, entity-tag aware file system driver 112 can set a corresponding md5_valid flag to False, or where the md5_valid flag exists and is set to False, leave it be.

When entity-tag aware file system driver 112 processes a GET object operation, entity-tag aware file system driver 112 can determine whether the corresponding md5_valid tag is True. If the corresponding md5_valid flag is True, entity-tag aware file system driver 112 can include the corresponding entity tag as part of a response to the GET object operation. Where the corresponding md5_valid tag is False, then entity-tag aware file system driver 112 can generate a new entity tag value and return this new entity tag value as part of responding to the GET object operation.

Similar to object storage protocol stack 110, file storage protocol stack 116 can receive a file storage operation and send it in an IRP that is directed to entity-tag aware file system driver 112 (which can provide access to file system storage 114).

Figure 2:
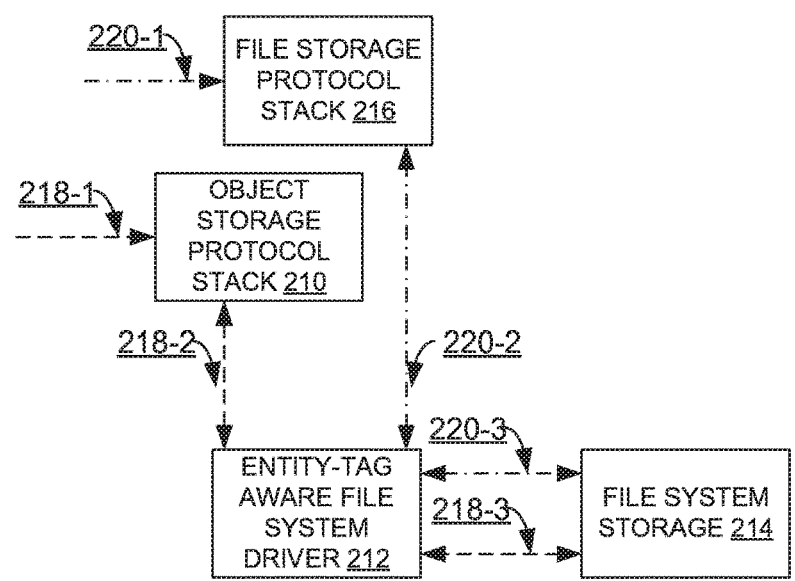
FIG. 2 illustrates another example system architecture that can facilitate maintaining consistent entity tags with multiple protocol data access, in accordance with certain embodiments of this disclosure.

FIG. 2 illustrates another example system architecture 200 that can facilitate maintaining consistent entity tags with multiple protocol data access, in accordance with certain embodiments of this disclosure.

As depicted, system architecture 200 comprises object storage protocol stack 210, entity-tag aware file system driver 212, file system storage 214, and file storage protocol stack 216. In some examples, object storage protocol stack 210 can be similar to object storage protocol stack 110 of FIG. 1; entity-tag aware file system driver 212 can be similar to entity-tag aware file system driver 112 of FIG. 1; file system storage 214 can be similar to file system storage 214 of FIG. 1; and file storage protocol stack 216 can be similar to file storage protocol stack 116 of FIG. 1.

The example of system architecture 200 can show how both object storage operations and file storage operations can be processed by system architecture 200 on the same file, and how system architecture 200 can maintain consistent entity tag behavior when processing both object storage operations and file storage operations on a given file.

In the example of FIG. 2, communication 218-1 comprises a request to perform an object storage operation that is received by object storage protocol stack 210 from a client computer and across a communications network (such as client computer 102a and communications network 104 of FIG. 1). In response, object storage protocol stack 208 sends an IRP 218-2 that indicates a corresponding file storage operation that is directed to file system driver 212. File system driver 212 can then instruct 218-3 file system storage 214 to perform the file system operation indicated by IRP 218-2, and receive an acknowledgment that it in turn relays to object storage protocol stack 210.

As for a file storage operation, communication 220-1 comprises a request to perform a file storage operation that is received by file storage protocol stack 216 from a client computer and across a communications network (such as client computer 102a and communications network 104 of FIG. 1). In response, file storage protocol stack 216 sends an IRP 220-2 that indicates a corresponding file storage operation that is directed to file system driver 212. File system driver 212 can then instruct 220-3 file system storage 214 to perform the file system operation indicated by IRP 220-2, and receive an acknowledgment that it in turn relays to file storage protocol stack 216.

These object storage operations and file storage operations can both be implemented on file system storage 214, and they can both be implemented on the same file in file system storage 214. For instance, a PUT object storage operation can be performed on a first file, and while that is being processed, a DELETE file storage operation can be processed for that first file.

Example Process Flows

Figure 3:
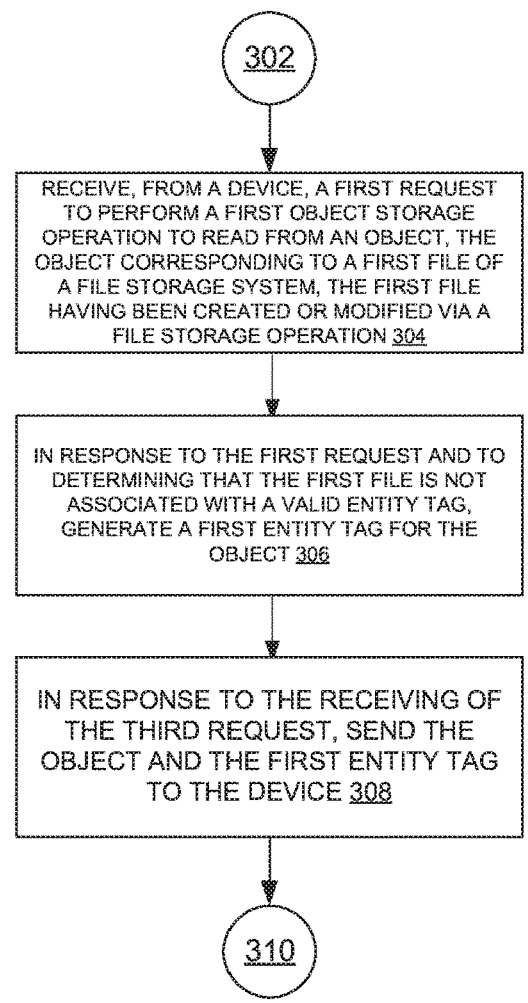
FIG. 3 illustrates an example process flow for maintaining consistent entity tags with multiple protocol data access, in accordance with certain embodiments of this disclosure.

FIG. 3 illustrates an example process flow 300 for maintaining consistent entity tags with multiple protocol data access, in accordance with certain embodiments of this disclosure. In some examples, aspects of process flow 300 can be implemented by server 106 of FIG. 1, or computing environment 1200 of FIG. 12.

It can be appreciated that the operating procedures of process flow 300 are example operating procedures, and that there can be embodiments that implement more or fewer operating procedures than are depicted, or that implement the depicted operating procedures in a different order than as depicted. In some examples, process flow 300 can be implemented in conjunction with aspects of one or more of process flow 400 of FIG. 4, process flow 500 of FIG. 5, process flow 600 of FIG. 6, process flow 700 of FIG. 7, process flow 800 of FIG. 8, process flow 900 of FIG. 9, process flow 1000 of FIG. 10, and process flow 1100 of FIG. 11.

Process flow 300 begins with 302, and moves to operation 304. Operation 304 depicts receiving, from a device, a first request to perform a first object storage operation to read from an object, the object corresponding to a first file of a file storage system, the first file having been created or modified via a file storage operation. That is, a system can support both an object storage protocol and a file storage protocol, and store data from both protocols in a file system. A client device can send a GET object operation to the system, where the GET object operation identifies an object, and data in that object is stored as a file in the system's file system.

This file can have been previously created or modified by a file system operation, which caused the system to either set a md5_valid flag as False (or not have set it as True in the first place, where a default value is False). That is, in some examples, operation 304 can comprise, before performing the receiving of the first request, receiving a second request to perform a file system operation to modify the first file, modifying the first file according to the second request, and in response to the receiving of the second request, storing a first value in a first data structure, the first value indicating that the first file is not associated with a valid entity tag. That is, the file can be modified according to a file system operation, and as a result does not have a valid entity tag.

In some examples, operation 304 can also comprise, before performing the receiving of the first request, receiving a second request to perform a file system operation to create the first file, creating the first file according to the second request, and in response to the receiving of the second request, storing a first value in a first data structure, the first value indicating that the first file is not associated with a valid entity tag. That is, the file can be created according to a file system operation, and as a result does not have a valid entity tag.

In some examples, the first request can be made according to a HTTP request. That is, object storage operations between a client device and the system can be communicated via HTTP communications. In some examples, the first entity tag is specified as a header of the HTTP request. This can be a Content-MD5 header of a HTTP request.

In some examples, operation 304 comprises, before performing the receiving of the first request, receiving, by the system, a second request to perform a second object storage operation to write to the object, wherein the second request indicates a second entity tag that corresponds to the first file. That is, the first file can have been created as part of a PUT object operation.

In some examples, operation 304 comprises, in response to the second request indicating the second entity tag, storing a first indication that the first file has a valid entity tag. That is, where the file was created as part of a PUT object operation, the PUT object operation could have identified an entity tag value that was then stored, and a corresponding md5_valid bit was set to True.

In some examples, operation 304 comprises, in response to modifying the first file according to a third request to perform a file system operation to modify the first file, storing a second indication that the first file lacks a valid entity tag. That is, the md5_valid bit can then be set to False where a file system operation is performed on the file.

In some examples, the file system operation corresponds to a Network File System protocol or a Server Message Block protocol. A NFS protocol and a SMB protocol can be examples of a file system protocol used to modify a file.

In some examples, the first object storage operation is received according to a representational state transfer (REST) web service. That is, a REST architecture can be utilized for sending object operations between a client and a server.

Operation 306 depicts, in response to the first request and to determining that the first file is not associated with a valid entity tag, generating a first entity tag for the object. That is, the first file can lack a valid entity tag for reasons such as, the file was modified by a file system operation subsequent to being created by a PUT object operation, the file was created with a file system operation, or the file was created with a PUT object operation that did not specify an entity tag for the object. In such cases, a system can respond to a GET object operation by creating an entity tag for the object. In an example, the system can combine a LIN corresponding to the object with a mtime value corresponding to the object.

That is, in some examples, operation 306 can comprise determining the first entity tag based on a logical Mode number of the system that corresponds to the first file and a file modification time of the first file. Furthermore, in some examples, the first identification value comprises a concatenation of a first 64-bit value for the logical Mode number and a second 64-bit value for the file modification time.

In some examples, operation 306 comprises storing the first entity value for the object in a user space extended attribute of the first file. That is, once the first entity value is determined by the system, it can then be stored by the system in an association with the file (along with setting a md5_valid value to True), so that it can be returned in response to subsequent GET object operations (so long as the corresponding file has not been modified subsequent to storing the first entity value).

Operation 308 depicts, in response to the receiving of the third request, sending the object and the first entity tag to the device. That is, the system can respond to a GET object operation with the object and the newly created entity tag value of operation 306. In some examples, operation 308 comprises sending the object via a HTTP communication.

In some examples, operation 308 comprises, after processing the first object storage operation, processing a second object storage operation to write to the object, and associating a second identification value with the object based on the second object storage operation. That is, an entity tag value for an object (and stored with its corresponding file) can be updated as a result of processing a PUT object operation that specifies the entity tag value.

In some examples, operation 308 comprises, in response to processing a second object storage operation to read the object prior to processing a file storage operation on the first file, determining that the first file is associated with a valid identity value, determining that a stored second identity value is associated with the first file, and responding to the second object storage operation with the second identification value. That is, a GET object operation on a file unmodified since a PUT object operation returns the original entity tag value from the PUT operation, which indicates that the object has not been modified by a subsequent PUT object operation or a file system operation.

In some examples, the second identification value indicates that the object is unchanged by a file system operation since it was created or last modified by a third object storage operation. That is, when the client receives the same identification value—the second identification value—as originally specified in a PUT object operation, that can indicate that the object has not been changed since that PUT object operation.

In some examples, the first identification value indicates that the object has changed by a file system operation since it was created or last modified by a second object storage operation. That is, where a client device that sends a GET object operation receives the first identification value, and the PUT object operation that created the file included the second identification value, then this different identification value—the first identification value—can indicate that the object has been changed since the original PUT object operation.

It can be appreciated that the operating procedures of process flow 300 are example operating procedures, and that there can be embodiments that implement more or fewer operating procedures than are depicted, or that implement the depicted operating procedures in a different order than as depicted. In some examples, process flow 300 can be implemented in conjunction with aspects of one or more of process flow 400 of FIG. 4, process flow 500 of FIG. 5, process flow 600 of FIG. 6, process flow 700 of FIG. 7, process flow 800 of FIG. 8, process flow 900 of FIG. 9, process flow 1000 of FIG. 10, and process flow 1100 of FIG. 11.

Figure 4:
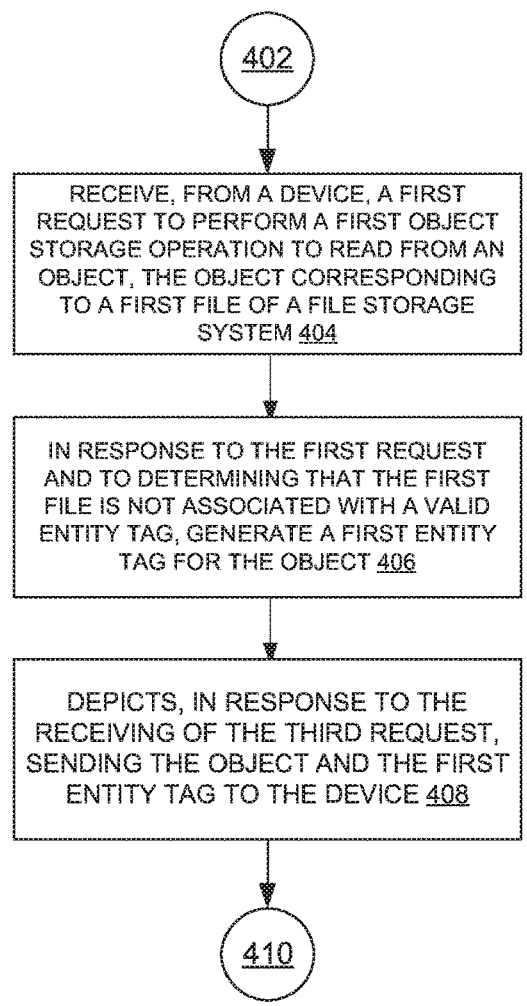
FIG. 4 illustrates another example process flow for maintaining consistent entity tags with multiple protocol data access, in accordance with certain embodiments of this disclosure.

FIG. 4 illustrates another example process flow 400 for maintaining consistent entity tags with multiple protocol data access, in accordance with certain embodiments of this disclosure. In some examples, aspects of process flow 400 can be implemented by server 106 of FIG. 1, or computing environment 1200 of FIG. 12.

It can be appreciated that the operating procedures of process flow 400 are example operating procedures, and that there can be embodiments that implement more or fewer operating procedures than are depicted, or that implement the depicted operating procedures in a different order than as depicted. In some examples, process flow 400 can be implemented in conjunction with aspects of one or more of process flow 300 of FIG. 3, process flow 500 of FIG. 5, process flow 600 of FIG. 6, process flow 700 of FIG. 7, process flow 800 of FIG. 8, process flow 900 of FIG. 9, process flow 1000 of FIG. 10, and process flow 1100 of FIG. 11.

Process flow 400 begins with 402 and moves to operation 404. Operation 404 depicts receiving, from a device, a first request to perform a first object storage operation to read from an object, the object corresponding to a first file of a file storage system. In some examples, operation 404 can be implemented in a similar manner as operation 304 of FIG. 3.

Operation 406 depicts in response to the first request and to determining that the first file is not associated with a valid entity tag, generating a first entity tag for the object. In some examples, operation 406 can be implemented in a similar manner as operation 306 of FIG. 3. Where a file that corresponds to an object lacks a valid entity tag, that can indicate that the file was modified or created according to a file system protocol (or that a valid entity tag was not provided as part of a PUT object operation). In such cases, it can be determined that a new entity tag value should be returned with the object. A system that implements operation 406 can generate an entity tag value in response to receiving a GET object operation from a client device, and return that newly-generated entity tag value to the client device as part of the response to the GET object operation.

Operation 408 depicts, in response to the receiving of the third request, sending the object and the first entity tag to the device. In some examples, operation 408 can be implemented in a similar manner as operation 308 of FIG. 3.

Figure 5:
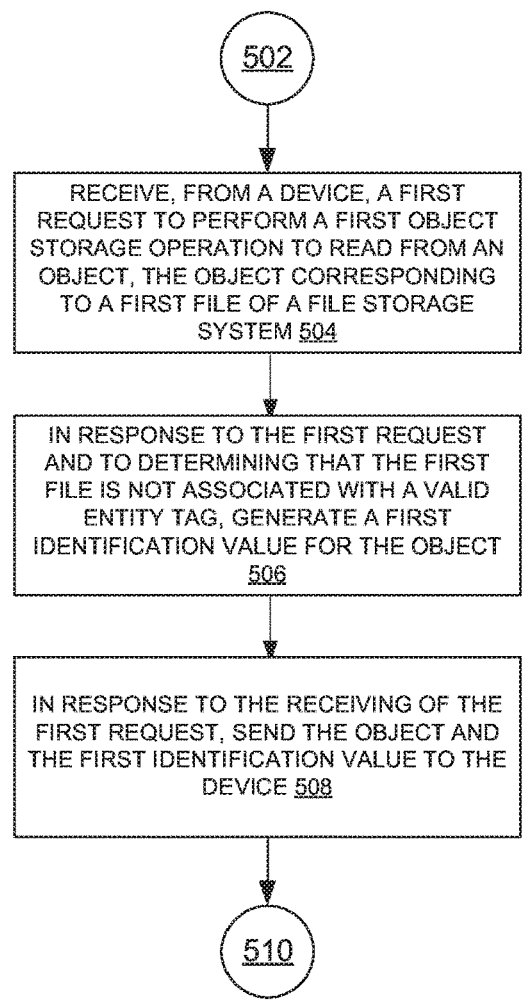
FIG. 5 illustrates another example process flow for maintaining consistent entity tags with multiple protocol data access, in accordance with certain embodiments of this disclosure.

FIG. 5 illustrates another example process flow 500 for maintaining consistent entity tags with multiple protocol data access, in accordance with certain embodiments of this disclosure. In some examples, aspects of process flow 500 can be implemented by server 106 of FIG. 1, or computing environment 1200 of FIG. 12.

It can be appreciated that the operating procedures of process flow 500 are example operating procedures, and that there can be embodiments that implement more or fewer operating procedures than are depicted, or that implement the depicted operating procedures in a different order than as depicted. In some examples, process flow 500 can be implemented in conjunction with aspects of one or more of process flow 300 of FIG. 3, process flow 400 of FIG. 4, process flow 600 of FIG. 6, process flow 700 of FIG. 7, process flow 800 of FIG. 8, process flow 900 of FIG. 9, process flow 1000 of FIG. 10, and process flow 1100 of FIG. 11.

Process flow 500 begins with 502, and moves to operation 504. Operation 504 depicts receiving, from a device, a first request to perform a first object storage operation to read from an object, the object corresponding to a first file of a file storage system. In some examples, operation 504 can be implemented in a similar manner as operation 304 of FIG. 3.

Operation 506 depicts, in response to the first request and to determining that the first file is not associated with a valid entity tag, generating a first identification value for the object. In some examples, operation 506 can be implemented in a similar manner as operation 306 of FIG. 3.

Operation 508 depicts, in response to the receiving of the first request, sending the object and the first identification value to the device. In some examples, operation 508 can be implemented in a similar manner as operation 308 of FIG. 3.

Figure 6:
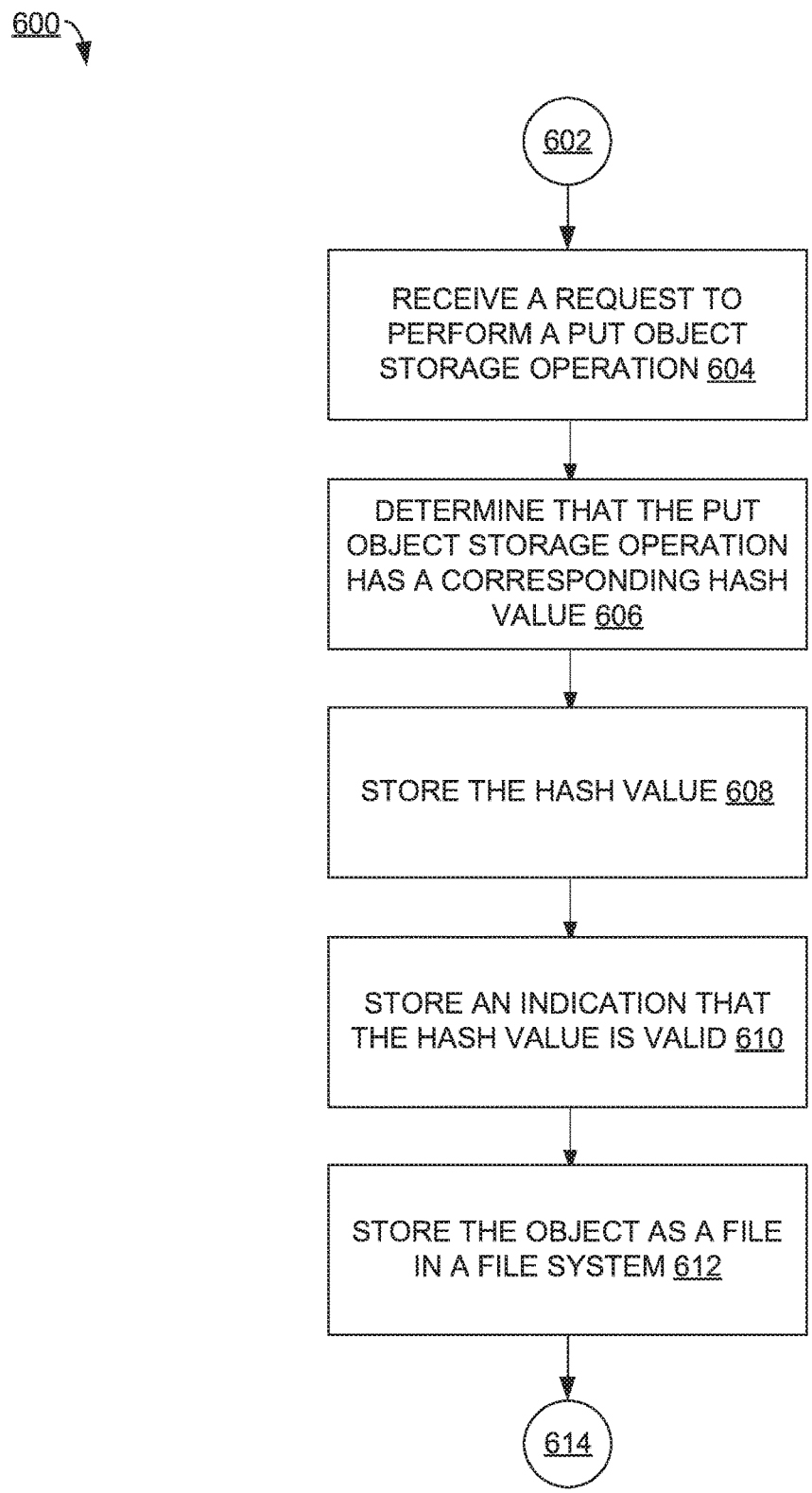
FIG. 6 illustrates an example process flow for maintaining consistent entity tags with multiple protocol data access when processing a PUT object storage operation that includes a hash value, in accordance with certain embodiments of this disclosure.

FIG. 6 illustrates an example process flow 600 for maintaining consistent entity tags with multiple protocol data access when processing a PUT object storage operation that includes a hash value, in accordance with certain embodiments of this disclosure. In some examples, aspects of process flow 600 can be implemented by server 106 of FIG. 1, or computing environment 1200 of FIG. 12.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with aspects of one or more of process flow 300 of FIG. 3, process flow 400 of FIG. 4, process flow 500 of FIG. 5, process flow 700 of FIG. 7, process flow 800 of FIG. 8, process flow 900 of FIG. 9, process flow 1000 of FIG. 10, and process flow 1100 of FIG. 11.

Process flow 600 begins with 602 and moves to 604. 604 depicts receiving a request to perform a PUT object storage operation. This request to perform a PUT object storage operation can be received by server 106 of FIG. 1 and from client 102*a*, which transmits the request via communications network 104. After 604, process flow 600 moves to 606.

Operation 606 depicts determining that the PUT object storage operation has a corresponding hash value. In some examples, the PUT object storage operation is sent as part of a HTTP message, and a corresponding hash value is contained in a Content-MD5 header. In such examples, operation 606 can comprise determining that the Content-MD5 header exists, and that it has a corresponding value. After 606, process flow 600 moves to 608.

Operation 608 depicts storing the hash value. In some examples, entity-tag aware file system driver 112 of FIG. 1 can store the hash value in an extended attribute of a file it stores that corresponds to the object of the PUT object operation. After 608, process flow 600 moves to 610.

Operation 610 depicts storing an indication that the hash value is valid. This can comprise entity-tag aware file system driver 112 of FIG. 1 setting a md5_valid bit to True as an extended attribute of the file it stores that corresponds to the object of the PUT object operation. After 610, process flow 600 moves to 612.

Operation 612 depicts storing the object as a file in a file system. This can comprise entity-tag aware file system driver 112 of FIG. 1 storing the data of the object as an object in file system storage 114. After 612, process flow 600 moves to 614, where process flow 600 ends.

Figure 7:
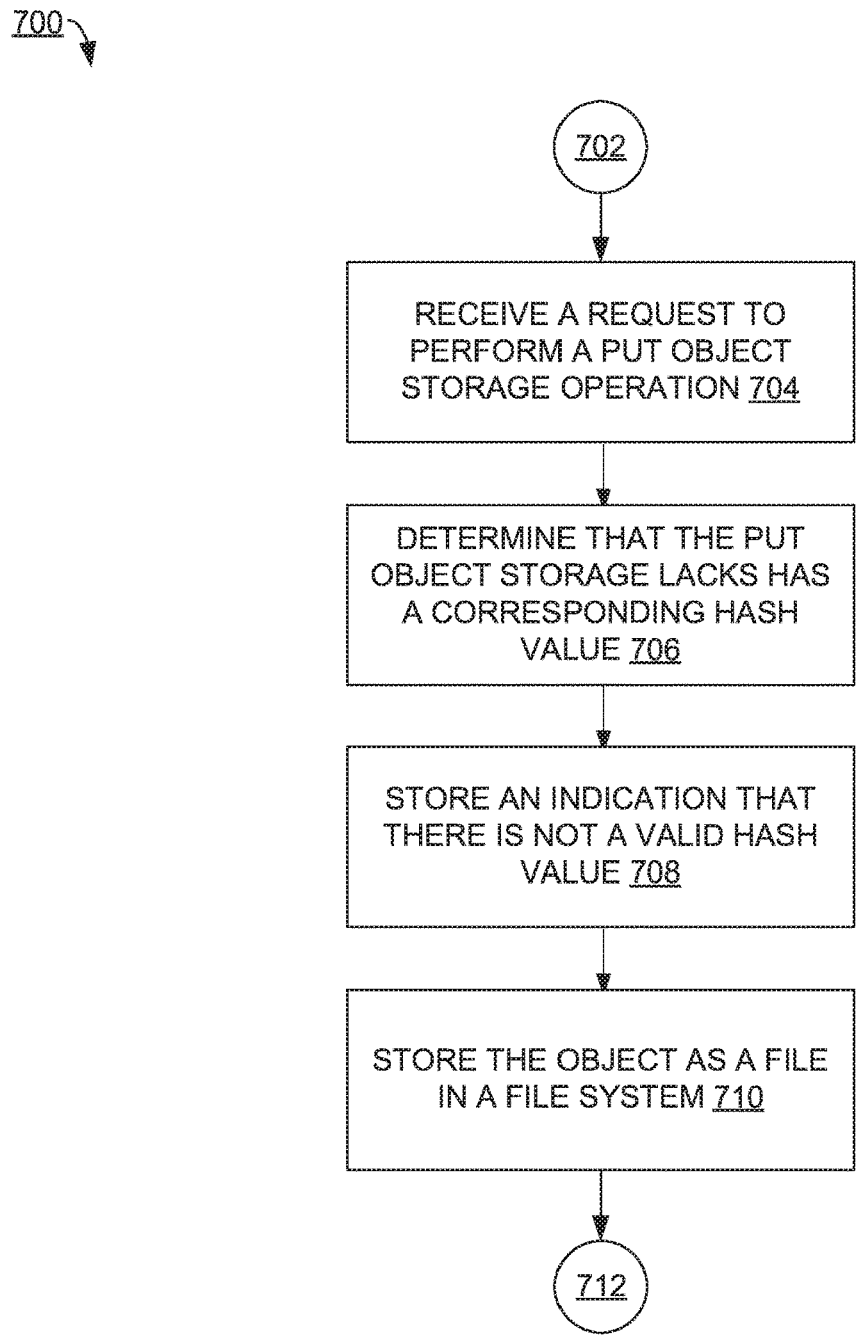
FIG. 7 illustrates an example process flow for maintaining consistent entity tags with multiple protocol data access when processing a PUT object storage operation that omits a hash value, in accordance with certain embodiments of this disclosure.

FIG. 7 illustrates an example process flow 700 for maintaining consistent entity tags with multiple protocol data access when processing a PUT object storage operation that omits a hash value, in accordance with certain embodiments of this disclosure. In some examples, aspects of process flow 700 can be implemented by server 106 of FIG. 1, or computing environment 1200 of FIG. 12.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with aspects of one or more of process flow 300 of FIG. 3, process flow 400 of FIG. 4, process flow 500 of FIG. 5, process flow 700 of FIG. 7, process flow 800 of FIG. 8, process flow 900 of FIG. 9, process flow 1000 of FIG. 10, and process flow 1100 of FIG. 11.

Process flow 700 begins with 702 and moves to operation 704. Operation 704 depicts receiving a request to perform a PUT object storage operation. In some examples, operation 704 can be implemented in a similar manner as operation 604 of FIG. 6. After operation 704, process flow 700 moves to operation 706.

Operation 706 depicts determining that the PUT object storage lacks has a corresponding hash value. In some examples, operation 706 can be implemented in a similar manner as operation 606 of FIG. 6, where operation 706 comprises determining that there is not a Content-MD5 header or that the Content-MD5 header does not specify a value. After operation 706, process flow 700 moves to operation 708.

Operation 708 depicts storing an indication that there is not a valid hash value. In some examples, operation 708 can comprise entity-tag aware file system driver 112 of FIG. 1 setting a md5_valid flag as False for a file that corresponds to the object of the PUT object operation. After operation 708, process flow 700 moves to operation 710.

Operation 710 depicts storing the object as a file in a file system. In some examples, operation 710 can be implemented in a similar manner as operation 612 of FIG. 6. After operation 710, process flow 700 moves to 712, where process flow 700 ends.

Figure 8:
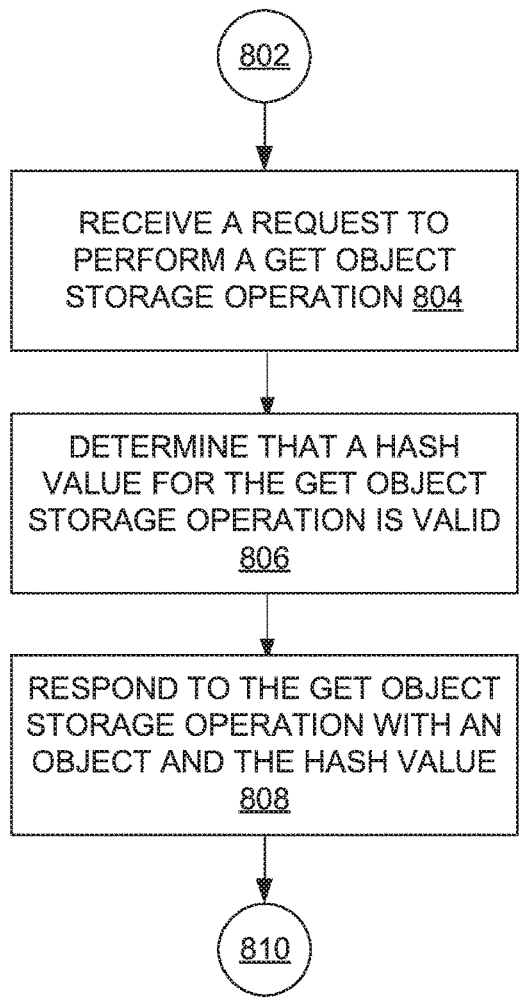
FIG. 8 illustrates an example process flow for maintaining consistent entity tags with multiple protocol data access when processing a GET object storage operation, in accordance with certain embodiments of this disclosure.

FIG. 8 illustrates an example process flow for maintaining consistent entity tags with multiple protocol data access when processing a GET object storage operation, in accordance with certain embodiments of this disclosure. In some examples, aspects of process flow 800 can be implemented by server 106 of FIG. 1, or computing environment 1200 of FIG. 12.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with aspects of one or more of process flow 300 of FIG. 3, process flow 400 of FIG. 4, process flow 500 of FIG. 5, process flow 600 of FIG. 6, process flow 700 of FIG. 7, process flow 900 of FIG. 9, process flow 1000 of FIG. 10, and process flow 1100 of FIG. 11.

Process flow 800 begins with 802 and moves to operation 804. Operation 804 depicts receiving a request to perform a GET object storage operation. In some examples, operation 804 can be implemented in a similar manner as operation 604 of FIG. 6, but with a GET object operation rather than a PUT object operation. After operation 804, process flow 800 moves to operation 806.

Operation 806 depicts determining that a hash value for the GET object storage operation is valid. In some examples, operation 806 can comprise entity-tag aware file system driver 112 of FIG. 1 determining that a md5_valid flag that corresponds to a file that corresponds to the object of the GET object operation is True. After operation 806, process flow 800 moves to operation 808.

Operation 808 depicts responding to the GET object storage operation with an object and the hash value. In some examples, this can comprise entity-tag aware file system driver 112 of FIG. 1 sending a HTTP response to client 102a that contains the object and where the hash value is specified in a Content-MD5 header. After operation 808, process flow 800 moves to 810, where process flow 800 ends.

Figure 9:
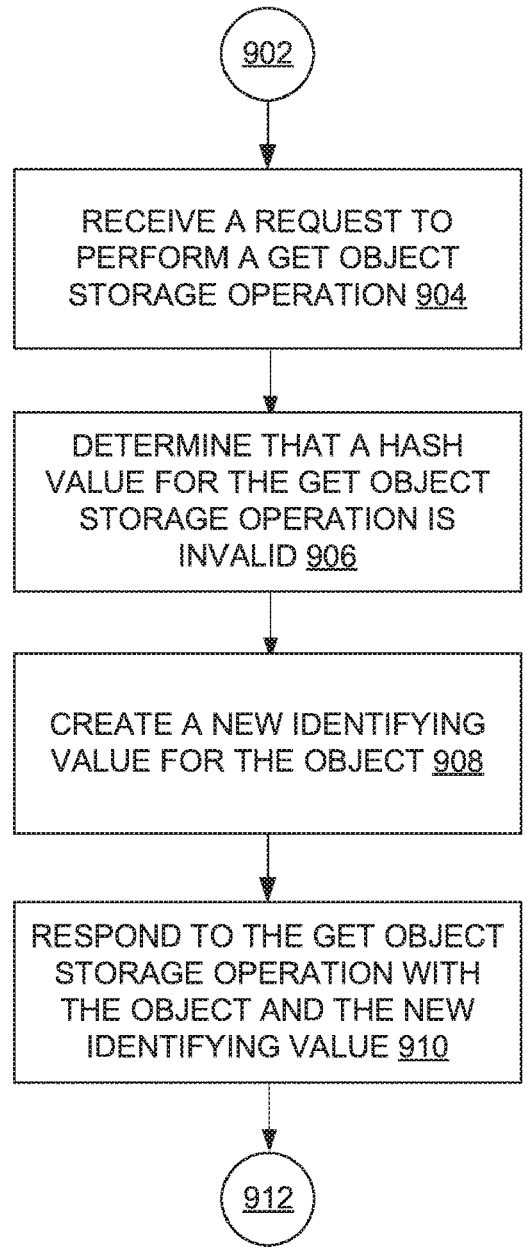
FIG. 9 illustrates another example process flow for maintaining consistent entity tags with multiple protocol data access when processing a GET object storage operation, in accordance with certain embodiments of this disclosure.

FIG. 9 illustrates another example process flow 900 for maintaining consistent entity tags with multiple protocol data access when processing a GET object storage operation, in accordance with certain embodiments of this disclosure. In some examples, aspects of process flow 900 can be implemented by server 106 of FIG. 1, or computing environment 1200 of FIG. 12.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with aspects of one or more of process flow 300 of FIG. 3, process flow 400 of FIG. 4, process flow 500 of FIG. 5, process flow 600 of FIG. 6, process flow 700 of FIG. 7, process flow 800 of FIG. 8, process flow 1000 of FIG. 10, and process flow 1100 of FIG. 11.

Process flow 900 begins with 902 and moves to operation 904. Operation 904 depicts receiving a request to perform a GET object storage operation. In some examples, operation 904 can be implemented in a similar manner as operation 804 of FIG. 8. After operation 904, process flow 900 moves to operation 906.

Operation 906 depicts determining that a hash value for the GET object storage operation is invalid. In some examples, operation 806 can comprise entity-tag aware file system driver 112 of FIG. 1 determining that a md5_valid flag that corresponds to a file that corresponds to the object of the GET object operation is False. After operation 906, process flow 900 moves to operation 908.

Operation 908 depicts creating a new identifying value for the object. In some examples, creating a new identifying value for the object can be implemented with process flow 1000 of FIG. 10. After operation 908, process flow 900 moves to operation 910.

Operation 910 depicts responding to the GET object storage operation with the object and the new identifying value. In some examples, operation 910 can be implemented in a similar manner as operation 808 of FIG. 8. After operation 910, process flow 900 moves to 912, where process flow 900 ends.

Figure 10:
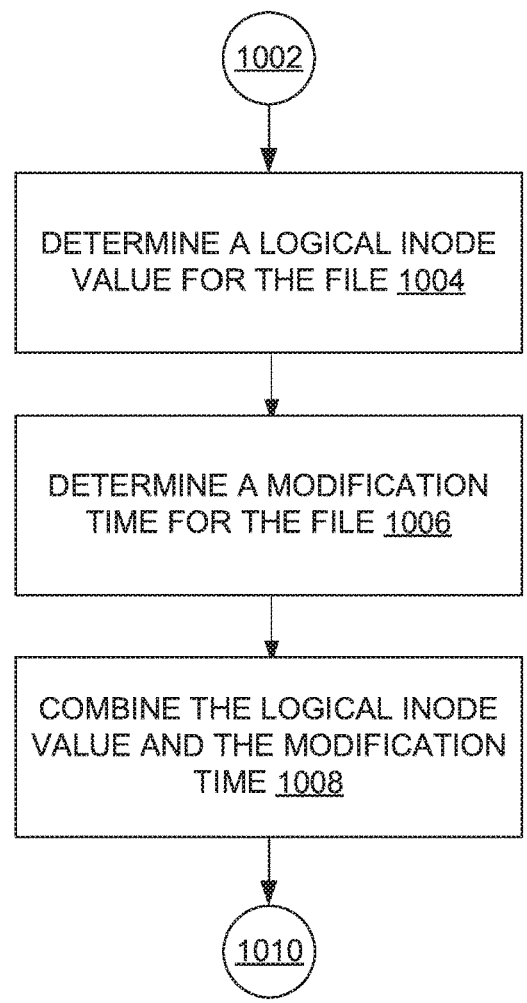
FIG. 10 illustrates an example process flow for maintaining consistent entity tags with multiple protocol data access when determining a new hash value for an object, in accordance with certain embodiments of this disclosure.

FIG. 10 illustrates an example process flow 1000 for maintaining consistent entity tags with multiple protocol data access when determining a new hash value for an object, in accordance with certain embodiments of this disclosure. In some examples, aspects of process flow 1000 can be implemented by server 106 of FIG. 1, or computing environment 1200 of FIG. 12.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with aspects of one or more of process flow 300 of FIG. 3, process flow 400 of FIG. 4, process flow 500 of FIG. 5, process flow 600 of FIG. 6, process flow 700 of FIG. 7, process flow 800 of FIG. 8, process flow 900 of FIG. 9, and process flow 1100 of FIG. 11.

Process flow 1000 begins with 1002, and moves to operation 1004. Operation 1004 depicts determining a logical inode value for the file. In some examples, file system storage 114 of FIG. 1 can store files in inodes (an inode can comprise a data structure in a file system that contains attributes and locations in disk blocks of some file data). In such examples, inodes can be identified by an inode number, or value, and entity-tag aware file system driver 112 can access a value of a logical inode of the file that corresponds to the object. After operation 1004, process flow 1000 moves to operation 1006.

Operation 1006 depicts determining a modification time for the file. A modification time (sometimes referred to as a mtime) can be stored as an attribute for a file in file system storage 114 of FIG. 1, and accessed by entity-tag aware file system driver 112. After operation 1006, process flow 1000 moves to operation 1008.

Operation 1008 depicts combining the logical Mode value and the modification time. In some examples, each of these values is stored as a 64-bit value, and they can be concatenated to produce a 128-bit value. After operation 1008, process flow 1000 moves to 1010, where process flow 1000 ends.

Figure 11:
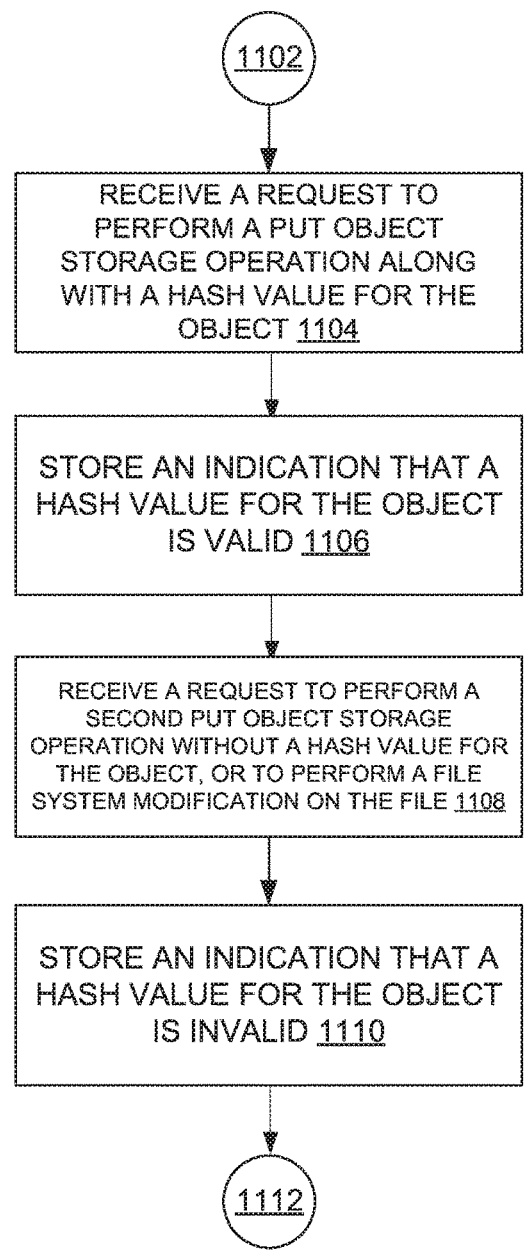
FIG. 11 illustrates an example process flow for maintaining consistent entity tags with multiple protocol data access when updating a metadata that indicates whether a hash value for an object is valid, in accordance with certain embodiments of this disclosure.

FIG. 11 illustrates an example process flow 1100 for maintaining consistent entity tags with multiple protocol data access when updating a metadata that indicates whether a hash value for an object is valid, in accordance with certain embodiments of this disclosure. In some examples, aspects of process flow 1100 can be implemented by server 106 of FIG. 1, or computing environment 1200 of FIG. 12.

It can be appreciated that the operating procedures of process flow 1100 are example operating procedures, and that there can be embodiments that implement more or fewer operating procedures than are depicted, or that implement the depicted operating procedures in a different order than as depicted. In some examples, process flow 1100 can be implemented in conjunction with aspects of one or more of process flow 300 of FIG. 3, process flow 400 of FIG. 4, process flow 500 of FIG. 5, process flow 600 of FIG. 6, process flow 700 of FIG. 7, process flow 800 of FIG. 8, process flow 900 of FIG. 9, and process flow 1000 of FIG. 10.

Process flow 1100 begins with 1102 and moves to operation 1104. Operation 1104 depicts receiving a request to perform a PUT object storage operation along with a hash value for the object. In some examples, operation 1104 can be implemented in a similar manner as operations 604 and 606 of FIG. 6. After operation 1104, process flow 1100 moves to operation 1106.

Operation 1106 depicts storing an indication that a hash value for the object is valid. In some examples, operation 1106 can be implemented in a similar manner as operation 610 of FIG. 6. After operation 1106, process flow 1100 moves to operation 1108.

Operation 1108 depicts receiving a request to perform a second PUT object storage operation without a hash value for the object, or to perform a file system modification on the file. In some examples, operation 1108 can be implemented in a similar manner as operations 704 and 706 of FIG. 7 (for a PUT object storage operation). In other examples, server 106 of FIG. 1 can receive a file system modification operation from client computer 102a, and via communications network 104. After operation 1108, process flow 1100 moves to operation 1110.

Operation 1110 depicts storing an indication that a hash value for the object is invalid. In some examples, operation 1110 can be implemented in a similar manner as operation 708 of FIG. 7. After operation 1110, process flow 1102 moves to 1102 where process flow 1100 ends.

Example Operating Environment

In order to provide additional context for various embodiments described herein, FIG. 12 and the following discussion are intended to provide a brief, general description of a suitable computing environment 1200 in which the various embodiments of the embodiment described herein can be implemented.

For example, aspects of computing environment 1200 can be used to implement aspects of client computer 102a, client computer 102b, and/or server 106 of FIG. 1. In some examples, computing environment 1200 can implement aspects of the process flows of FIGS. 3-11 to facilitate keeping object access on a file store consistent with other file protocols.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enable with a security module, such as a trusted processing module (TPM). For instance, with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. In an aspect, when a processor executes instructions to perform "operations", this could include the processor performing the operations directly and/or facilitating, directing, or cooperating with another device or component to perform the operations.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
receiving, from a device, a first request to perform a first object storage operation to read from an object according to an object storage protocol configured to read and modify data objects, the object corresponding to a first file of a file storage system, the first file having been created or modified via a file storage operation;
in response to the first request and to determining that the first file is not associated with a valid entity tag according to the object storage protocol and as a result of the first file having been created or modified via the file storage operation, wherein determining that the first file is not associated with the valid entity tag comprises determining that an extended attribute of the first file indicates that a corresponding entity tag is invalid, generating a first entity tag for the object; and
in response to the receiving of the first request, sending the object and the first entity tag to the device.

2. The system of claim 1, wherein the operations further comprise:
before performing the receiving of the first request, receiving a second request to perform a file system operation to modify the first file;
modifying the first file according to the second request; and
in response to the receiving of the second request, storing a first value in a first data structure, the first value indicating that the first file is not associated with another valid entity tag that comprises the valid entity tag or a second valid entity tag.

3. The system of claim 1, wherein the operations further comprise:
before performing the receiving of the first request, receiving a second request to perform a file system operation to create the first file;
creating the first file according to the second request; and
in response to the receiving of the second request, storing a first value in a first data structure, the first value indicating that the first file is not associated with another valid entity tag that comprises the valid entity tag or a second valid entity tag.

4. The system of claim 1, wherein the first request comprises a hypertext transfer protocol (HTTP) request.

5. The system of claim 4, wherein the first entity tag is specified as a header of the HTTP request.

6. The system of claim 1, wherein the operations further comprise:
storing the first entity tag for the object in a user space extended attribute of the first file.

7. The system of claim 1, wherein the sending of the object comprises sending a hypertext transfer protocol communication.

8. A method, comprising:
receiving, by a system comprising a processor, and from a device, a first request to perform a first object storage operation to read from an object according to an object storage protocol configured to read and modify data objects, the object corresponding to a first file of a file storage system;
in response to the first request and to determining that the first file is not associated with a valid entity tag as a result of the first file having been created or modified via a file storage operation, generating, by the system, a first entity tag for the object, wherein determining that the first file is not associated with the valid entity tag comprises determining that an extended attribute of the first file indicates that a corresponding entity tag is invalid; and
in response to the receiving of the first request, sending, by the system, the object and the first entity tag to the device.

9. The method of claim 8, further comprising:
before performing the receiving of the first request, receiving, by the system, a second request to perform a second object storage operation to write to the object, wherein the second request indicates a second entity tag that corresponds to the first file.

10. The method of claim 9, further comprising:
in response to the second request indicating the second entity tag, storing a first indication that the first file has another valid entity tag that comprises the valid entity tag or a second valid entity tag.

11. The method of claim 10, further comprising:
in response to modifying the first file according to a third request to perform a file system operation to modify the first file, storing a second indication that the first file lacks another valid entity tag that comprises the valid entity tag or the second valid entity tag.

12. The method of claim 11, wherein the file system operation corresponds to a network file system protocol or a server message block protocol.

13. The method of claim 9, further comprising:
determining, by the system, the first entity tag based on a logical inode number of the system that corresponds to the first file and a file modification time of the first file.

14. The method of claim 13, wherein first identification value comprises a concatenation of a first 64-bit value for the logical inode number and a second 64-bit value for the file modification time.

15. A non-transitory computer-readable medium comprising instructions that, in response to execution, cause a system comprising a processor to perform operations, comprising:
receiving, from a device, a first request to perform a first object storage operation to read from an object according to an object storage protocol configured to read and modify data objects, the object corresponding to a first file of a file storage system;
in response to the first request and to determining that the first file is not associated with a valid entity tag as a result of the first file having been created or modified via a file storage operation, generating a first identification value for the object, wherein determining that the first file is not associated with the valid entity tag comprises determining that an extended attribute of the first file indicates that a corresponding entity tag is invalid; and
in response to the receiving of the first request, sending the object and the first identification value to the device.

16. The non-transitory computer-readable medium of claim 15, wherein the operations further comprise:
after processing the first object storage operation, processing a second object storage operation to write to the object; and
associating a second identification value with the object based on the second object storage operation.

17. The non-transitory computer-readable medium of claim 15, wherein the operations further comprise:
in response to processing a second object storage operation to read the object prior to processing a file storage operation on the first file, determining that the first file is associated with a valid identity value; and
determining that a stored second identity value is associated with the first file; and
responding to the second object storage operation with the stored second identity value.

18. The non-transitory computer-readable medium of claim 17, wherein the second identity value indicates that the object is unchanged by a file system operation since it was created or last modified by a third object storage operation.

19. The non-transitory computer-readable medium of claim 15, wherein the first identification value indicates that the object has changed by a file system operation since it was created or last modified by a second object storage operation.

20. The non-transitory computer-readable medium of claim 15, wherein the first object storage operation is received according to a representational state transfer web service.

* * * * *